Patented Mar. 24, 1925.

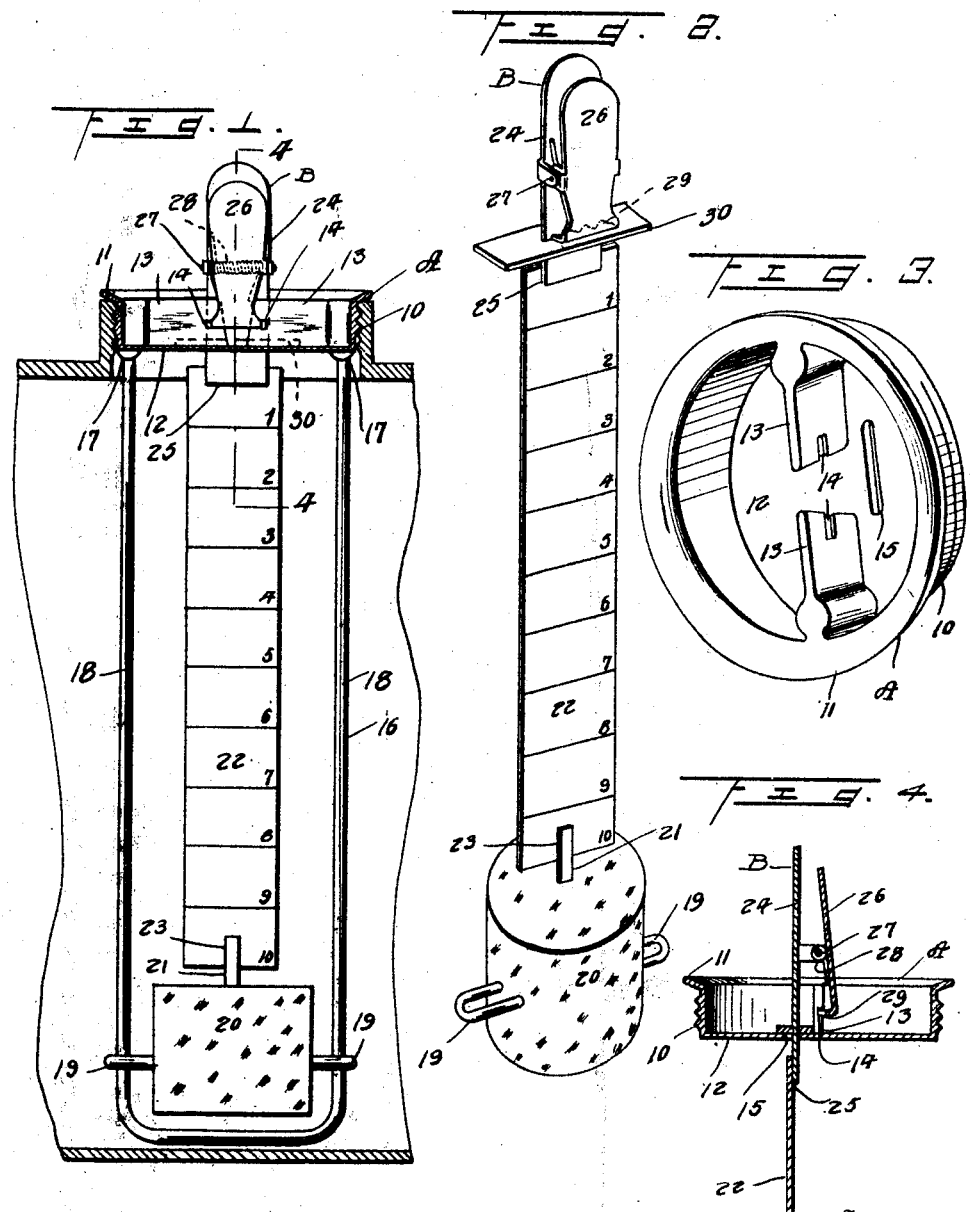

1,531,200

UNITED STATES PATENT OFFICE.

HENRY A. LEHR, OF FARGO, NORTH DAKOTA.

LIQUID-LEVEL INDICATOR.

Application filed July 11, 1922. Serial No. 574,245.

*To all whom it may concern:*

Be it known that I, HENRY A. LEHR, a citizen of the United States, residing at Fargo, in the county of Cass and State of North Dakota, have invented certain new and useful Improvements in Liquid-Level Indicators; and I do hereby declare the following to be a full, clear, and exact description of the invention, such as will enable others skilled in the art to which it appertains to make and use the same.

This invention relates to a liquid gage or measure indicator.

It is aimed to provide a novel construction generally improved, inexpensive and capable of expeditious manufacture and primarily adapted for use on fuel tanks as carried by automobiles so that the quantity of fuel such as gasoline within the tank may be readily ascertained without removing the closure therefrom.

Another object is to provide a construction which may be mounted on or carried by a cap or plug and which latter may be the closure cap or plug of the tank.

Still another object is to provide a gage structure adapted for mounting on such a closure cap provided with an upstanding manipulating flange and having means to coact with said flange to normally maintain the gage inactive or lowered.

Additional objects and advantages will become apparent from a consideration of the description following taken in connection with accompanying drawings illustrating one practical embodiment.

In said drawings:—

Figure 1 is a vertical sectional view illustrating my improvement;

Figure 2 is a detail perspective view of the gage alone;

Figure 3 is a detail perspective view of the cap or plug on which the gage is mounted, and Figure 4 is a sectional view on the line 4—4 of Figure 1.

Like reference characters designate like or similar parts in the different views.

In reducing the invention to practice, a closure cap is provided as at A preferably adapted to close the filling opening of a gasoline or fuel tank of an automobile and to this end having attaching screw threads as illustrated at 10, being generally cup-shaped and having an outer marginal flange as at 11 and on the exterior of which said screw threads 10 are directly provided. The cap has a base wall at 12 and a flange 13 integral with said wall and rising therefrom and extending diametrically of the cap and being interrupted centrally of the cap and which flange 13 is equivalent to the finger-engaging flange on said cap which is engageable to turn the cap. Sections of the flange 13 are provided with grooves at 14 and the wall 12 has a flap 15 provided therethrough adjacent one side of the flange 13.

Soldered or otherwise secured to the cap A is a guide frame 16 as at 17. Guide frame 16 is substantially of U-shape having side portions 18 straddled by staples 19 which are driven into a float 20 of any suitable material such as wood or cork. An anchoring rod 21 penetrates the float 20 and is soldered or otherwise secured to a gage bar 22 as at 23.

Said gage bar 22 is slidable through the slot 15. At the upper end of the gage bar a clasp generally designated B is provided. This clasp consists of a fixed plate 24 which may be soldered or otherwise rigidly fastened to the bar 22 as at 25. A movable plate or jaw 26 is pivoted as at 27 to the plate 24 and at the pivot a spring 28 is provided which urges the jaw 26 into engagement with the plate 24 at its lower end. The jaw is serrated if desired as at 29.

The bar 24 extends through and is soldered to a guard plate 30 intermediate the bar 22 and the jaw 26.

In use, with the gage part attached to the cap or closure A as shown in Figure 1, the cap is screwed into a gasoline tank, as on an automobile. The liquid fuel therein will coact with the float 20 so as to proportionately elevate the bar 22 and through the calibrations or indications thereon, indicate the quantity of gasoline or fuel within the tank. After the observation of the gage has been made, the clasp B is engaged and depressed so as to lower the gage bar and the float 20 into the tank against the buoyancy of the float, placing the plate 30 over the opening 13 so as to guard the same against escape of fuel therethrough and thereupon tilting the jaw 26 in order that its teeth 29 will enter the groove 14. In the latter position, the jaw 26 is released and accordingly the parts are held depressed so that the opening 15 will be closed and the gage held against vibration.

As merely one practical embodiment has been illustrated and described, it is to be understood that changes in the details may be resorted to provided they fall within the spirit and scope of the invention.

I claim as my invention:—

1. A liquid level indicator including a float-actuated gage bar, a cap having a slot therein, means associating said bar with said cap for sliding movement through said slot, said cap having a diametrically disposed flange provided with a longitudinal groove, said groove being adjacent to said slot, said flange constituting a manipulating means for the cap, and a clasp carried by the upper end of the bar and adapted to co-act with said groove to maintain the bar in a lowered position.

2. A liquid level indicator including a float actuated gage bar, a cap provided with a slot through which said bar is slidable, said cap having an upstanding flange extending diametrically thereof, there being a lateral groove in said flange adjacent to the slot in said cap, a resilient clasp secured to the upper end of said bar, a guard plate carried by said bar immediately below the clasp and adapted to close said slot when the bar is in a lowered position, said clasp being adapted to engage in said groove to maintain the gage bar in a lowered position.

In testimony whereof I affix my signature in presence of two witnesses.

HENRY A. LEHR.

Witnesses:
CHRISTOPHER JOHNSTON,
WARNER F. ZACHER.